(12) United States Patent
Bakir

(10) Patent No.: US 12,405,952 B2
(45) Date of Patent: Sep. 2, 2025

(54) ZERO KNOWLEDGE RESPONSE

(71) Applicant: Google LLC, Mountain View, CA (US)

(72) Inventor: Hasan Gökhan Bakir, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/522,471

(22) Filed: Nov. 29, 2023

(65) Prior Publication Data

US 2025/0173336 A1 May 29, 2025

(51) Int. Cl.
*G06F 16/2453* (2019.01)
*G06F 16/2452* (2019.01)

(52) U.S. Cl.
CPC .. *G06F 16/24542* (2019.01); *G06F 16/24522* (2019.01)

(58) Field of Classification Search
CPC ............... G06F 16/24542; G06F 16/24522
See application file for complete search history.

(56) References Cited

U.S. PATENT DOCUMENTS

| | | | | |
|---|---|---|---|---|
| 10,769,148 | B1* | 9/2020 | Binkert | G06F 16/24542 |
| 11,216,457 | B1* | 1/2022 | Pandis | G06F 16/22 |
| 11,615,080 | B1* | 3/2023 | Naganathan | G06F 16/24542 |
| | | | | 707/759 |
| 11,763,029 | B2* | 9/2023 | Avanes | G06F 21/6254 |
| 12,282,504 | B1* | 4/2025 | Ganesh | G06F 16/3347 |
| 2002/0087967 | A1* | 7/2002 | Conkwright | G06Q 30/0269 |
| | | | | 725/1 |
| 2008/0235199 | A1* | 9/2008 | Li | G06F 16/243 |
| 2018/0232533 | A1 | 8/2018 | Egorov et al. | |
| 2019/0220464 | A1* | 7/2019 | Butani | G06F 16/24542 |
| 2019/0236598 | A1* | 8/2019 | Padmanabhan | G06Q 20/389 |
| 2020/0287718 | A1 | 9/2020 | Hildebrand et al. | |
| 2022/0382852 | A1* | 12/2022 | Yang | G06F 16/951 |
| 2023/0401333 | A1* | 12/2023 | Avanes | G06F 21/6254 |

OTHER PUBLICATIONS

Dowlin et al. CryptoNets: Applying Neural Networks to Encrypted Data with High Throughput and Accuracy. Feb. 24, 2016. 12 pages.
Fang et al. Beyond Lexical: A Semantic Retrieval Framework for Textual SearchEngine. Aug. 10, 2020. 10 pages. Retrieved from the Internet: <https://arxiv.org/abs/2008.03917>.
Gao et al. Precise Zero-Shot Dense Retrieval without Relevance Labels. Dec. 10, 2022. 11 pages.
Janakiram MSV. How to Reduce the Hallucinations from Large Language Models. Jun. 9, 2023. 13 pages. Retrieved from the Internet: <https://thenewstack.io/how-to-reduce-the-hallucinations-from-large-language-models/>.

* cited by examiner

*Primary Examiner* — Angelica Ruiz
(74) *Attorney, Agent, or Firm* — Lerner David LLP

(57) ABSTRACT

Aspects of the disclosure are directed to processing data stored in an external storage system using a machine learning model without exposing the data. Processing data may refer to document retrieval or question-answering, as examples. The external storage system may refer to a storage system separate from a processing system for the machine learning model. To process the data, the machine learning model generates a plan and provides the plan to the external storage system for execution and response generation. Generating the plan allows for accurately processing data without requiring access to the data.

20 Claims, 7 Drawing Sheets

ZERO KNOWLEDGE RESPONSE

BACKGROUND

The vault problem may refer to how a machine learning service can process data stored in particular storage systems. For example, the data may be stored in a secure storage system that can be considered a "vault" where access to the data by the machine learning service may be limited. Solutions to the vault problem include full holomorphic encryption (FHE) and/or user side semantic embeddings. FHE is an encryption protocol for neural networks allowing for training and inference on encrypted data while only allowing the user to decrypt predictions. However, FHE requires a large amount of power to process data as well as multi-turn communication between user and machine learning service provider through each pass through the neural network. User side semantic embeddings is a protocol where data is encoded before being sent to and processed by the machine learning service provider. However, this couples the semantic ability of machine learning models on the server side with the computational ability of devices on the user side, restricting the ability of the machine learning service to improve and update the machine learning models.

BRIEF SUMMARY

Aspects of the disclosure are directed to processing data stored in an external storage system using a machine learning model without exposing the data. Processing data may refer to document retrieval or question-answering, as examples. The external storage system may refer to a storage system separate from a processing system for the machine learning model. To process the data, the machine learning model generates a plan and provides the plan to the external storage system for execution and response generation. Generating the plan allows for accurately processing data without requiring access to the data.

An aspect of the disclosure provides for a method for processing a query, the method including: receiving, by one or more processors, a query associated with data stored in a storage system external to the one or more processors; generating, by the one or more processors, a query plan based on the query using a machine learning model, the query plan comprising a dependency tree of operations with a plurality of search candidates and one or more processing operations as leaves of the dependency tree; and transmitting, by the one or more processors, the query plan to the storage system to be executed by the storage system.

Another aspect of the disclosure provides for a system including: one or more processors; and one or more storage devices coupled to the one or more processors and storing instructions that, when executed by the one or more processors, cause the one or more processors to perform operations for processing a query, the operations including: receiving a query associated with data stored in a storage system external to the one or more processors; generating a query plan based on the query using a machine learning model, the query plan comprising a dependency tree of operations with a plurality of search candidates and one or more processing operations as leaves of the dependency tree; and transmitting the query plan to the storage system to be executed by the storage system.

Yet another aspect of the disclosure provides for a non-transitory computer readable medium for storing instructions that, when executed by one or more processors, cause the one or more processors to perform operations for processing a query, the operations comprising: receiving a query associated with data stored in a storage system external to the one or more processors; generating a query plan based on the query using a machine learning model, the query plan comprising a dependency tree of operations with a plurality of search candidates and one or more processing operations as leaves of the dependency tree; and transmitting the query plan to the storage system to be executed by the storage system.

In an example, the query is associated with a task including at least one of document retrieval or question answering. In another example, the dependency tree includes the query as a root of the dependency tree.

In yet another example, the search candidates include at least one of document retrieval by embedding, lexical search, or image search. In yet another example, the search candidates include hallucinations generated by the machine learning model to represent the data stored in the storage system.

In yet another example, the processing operations include at least one of merging operations or translating operations. In yet another example, the merging operations comprise at least one of filtering, joining, or reranking of search results generated by the search candidates. In yet another example, the translating operations include translating natural language into at least one of standard query language or graphical query language.

In yet another example, the query plan is represented as execution instructions for the storage system or a solution template with slots to be defined by the data in the storage system.

In yet another example, the method or operations further include refining the query plan using the machine learning model based on data available to the machine learning model to provide context for the search candidates. In yet another example, generating the query plan further includes: translating the query into a structured language having search constraints representing the search candidates and processing operations; and compiling the structured language to form the dependency tree.

DETAILED DESCRIPTION

Figure 1:
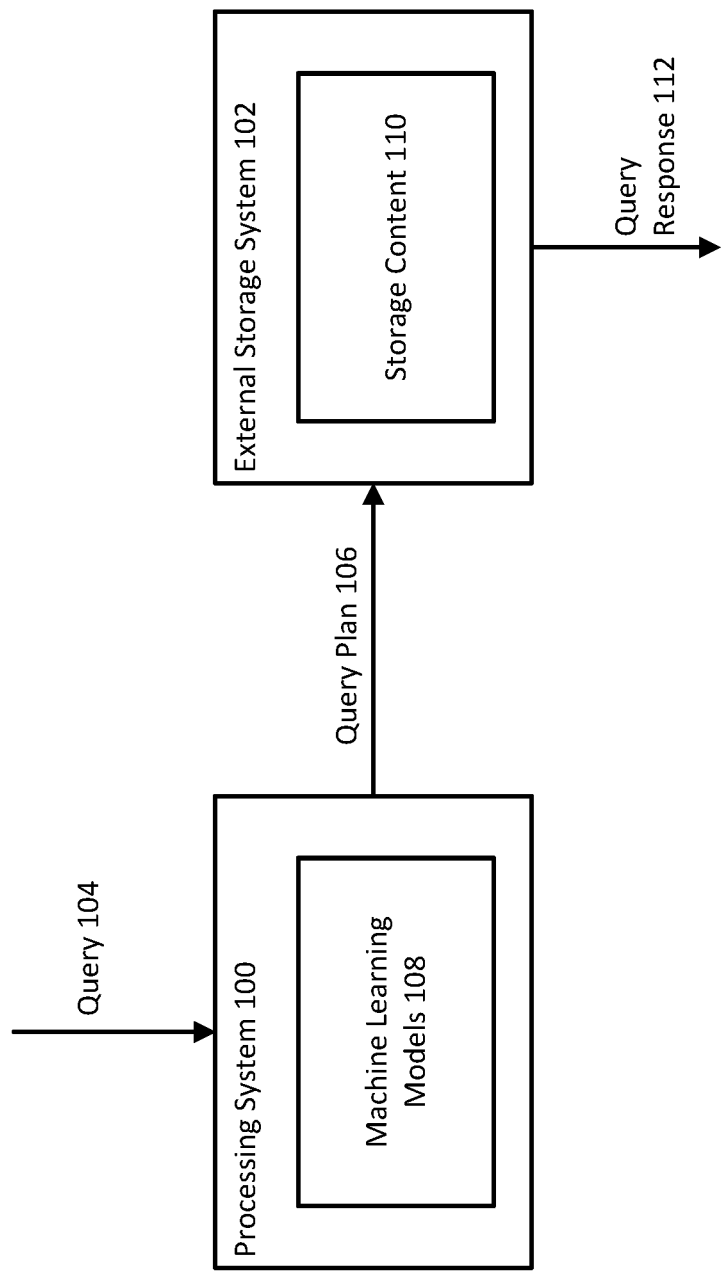
FIG. 1 depicts a block diagram of an example processing system and external storage system according to aspects of the disclosure.

The technology relates generally to an approach for a machine learning service to respond to a query where data for processing the query is stored in particular storage systems, such as storage systems that may be considered a "vault". Example tasks associated with the machine learning service can include document retrieval or question answering. For retrieval, the approach can generate a query plan specifying retrieval of a document without access to content of the document or other documents. For question answering, the approach can generate a query plan for providing an answer to a question specified in a query without exposing content utilized in answering the question. The approach can allow for the machine learning service to accurately respond to queries without the machine learning service processing the query by accessing the data stored in the storage systems that may be considered "vaults". Example storage systems that may be considered "vaults" include secure storage systems, local storage systems, eventually consistent storage systems, and/or any system where the machine learning service processing and the data are not included in the same domain.

The approach can include receiving a query associated with data in an external storage system, generating a query plan for responding to the query using a machine learning model, and providing the query plan to the external storage system for execution and query response generation. The approach can further include receiving the query response for responding to the query from the external storage system.

Generating the query plan can include generating a dependency tree of operations based on the query using the machine learning model. The tree of operations can include the query as the root with a plurality of search candidates and one or more processing operations as leaves. Search candidates can include a form of search, such as document retrieval by embedding, lexical search, and/or image search, and content for searching. For example, document retrieval by embedding can include using the machine learning model to generate hallucinations to resemble the document to be retrieved and performing semantic matching based on the generated hallucinations. Hallucinations here may refer to the machine learning model creating a representation of the document to be retrieved, but not the actual document. Processing operations can include merge operations, such as filtering, joining, and/or reranking of the search results generated by the search candidates, as examples. Other processing operations can include translating natural language to standard query language or graphical query language, as examples. The query plan can be expressed as execution instructions to be performed by the external storage system or as a solution template with slots, e.g., empty fields, to be defined by the data in the external storage system. The tree of operations can further include enriching the search candidates with already available information, such as publicly available information or any other information already known. Enriching the search candidates can include providing context for the search candidates to aid the processing operations. Such context can include definitions, descriptions, and/or characteristics of the search candidates to include further detail in the query plan.

The machine learning model can be a large language model, as an example. The machine learning model can translate the query into a query plan in a structured language, such as structured query language or graphical query language. The structured language can include search constraints to represent the search candidates and processing operations, which can be the leaves of the dependency tree. The structured language can be compiled into the tree of operations.

The generated query plans can be stored in a database for future retrieval based on subsequently received queries. For example, a query can be mapped to a query plan via a multi-class problem where various query plans would be candidates stored in a database. Depending on the content included in the query, a previously generated query plan can be retrieved, rather than generating a new query plan using the large language model for each query.

As an example, the following query can be received: "Show me all patients between 40 and 60 years olds that have Alzheimer's and live close to a nuclear power plant." Based on the query, a query plan can be generated using a machine learning model that includes steps: (1) Search—Alzheimer's disease patients; (2) Search—patients between 40 and 60 years olds; and (3) Rerank—patients living near nuclear power plant. The query plan can also include context for the steps based on already available information, such as (1) Alzheimer's disease patients—{known symptoms of Alzheimer's}; (2) patients between 40 and 60 years old—{age}; and (3) patients living near nuclear power plant—{postal codes considered near a nuclear power plant}. The machine learning model can generate the query plan to be transmitted to and executed by an external storage system. The query plan can be a set of instructions to be performed by the external storage system. As one example, this set of instructions may include: (1) search for Alzheimer's disease patients; (2) search for patients between 40 and 60 years old; (3) merge search results, e.g., reciprocal rank fusion; and (4) filter search results for patients living in postal codes near a nuclear power plant.

Generating the query plan can allow for translation of a query, or refinement of the query using external information, so that it is amenable for searching without accessing data in storage systems external to the processing systems. This can result in the ability to respond to queries without needing to access secure, local, and/or eventually consistent data for processing the query. As such, storage systems can be designed with less computational requirements and more of a focus on storage capacity.

FIG. 1 depicts a block diagram of an example processing system 100 and external storage system 102. The processing system 100 is configured to receive a query 104, generate a query plan 106 using one or more machine learning models 108 to respond to the query 104, and output the query plan 106 to the external storage system 102. The external storage system 102 is configured to receive the query plan 106, execute the query plan 106 using storage content 110, and output a query response 112 for responding to the query 104. The query response 112 can be output back to the processing system 100 or can be output directly to the origin of the query 104.

The processing system 102 can be implemented on one or more computing devices in one or more locations. For example, the processing system can be implemented in one or more server computing devices associated with a datacenter. The datacenter can house one or more hardware accelerators on which the machine learning models 108 are deployed. The external storage system 102 can be any storage system separate from the processing system 102 and can also be implemented on one or more computing devices in one or more locations. For example, the external storage system 102 can be a secure storage system, a local storage system, an eventually consistent storage system, and/or any storage system where query processing and data are in separate domains.

The query 104 can be associated with a task, such as content retrieval or question answering. Content retrieval may refer to asking for retrieval of particular content of the storage content 110 and outputting that particular content as the query response 112. Question answering may refer to asking a question associated with particular content of the storage content 110 and outputting an answer to the question as the query response 112.

The processing system 102 can process the query 104 to generate the query plan 106 using the machine learning models 108 without accessing the storage content 110. This can allow for the external storage system 102 to be implemented with less processing power and more of a focus on storage capacity, resulting in an increase in storage density.

Figure 2:
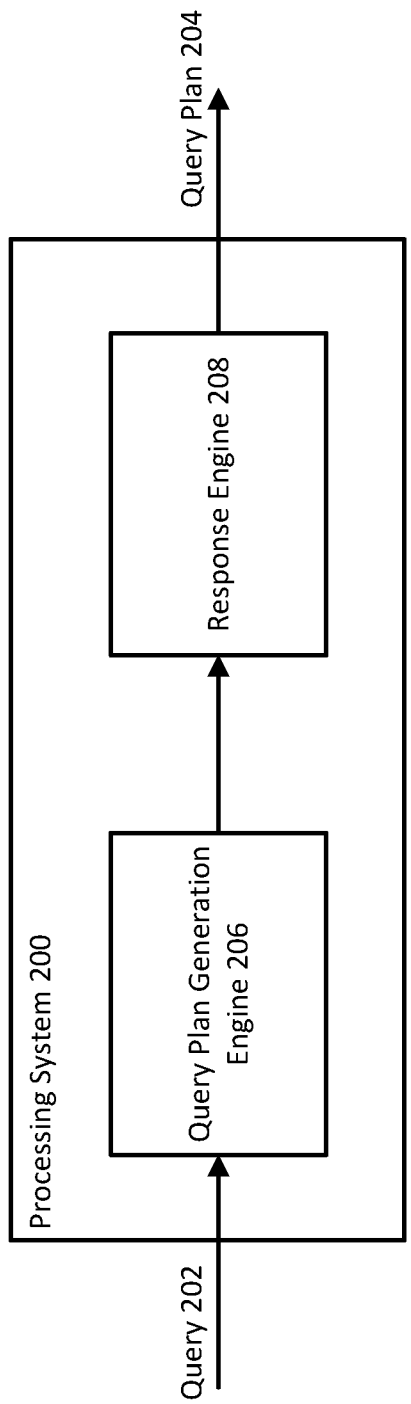
FIG. 2 depicts a block diagram of an example processing system according to aspects of the disclosure.

FIG. 2 depicts a block diagram of an example processing system 200. The processing system 200 can correspond to the processing system 100 as depicted in FIG. 1.

The processing system 200 can be configured to receive one or more queries 202. The queries 202 can correspond to requests associated with one or more tasks, such as content retrieval or question answering. For example, the processing system 200 can receive the query 202 as part of a call to an application programming interface (API) exposing the processing system 200 to one or more computing devices. The query 202 can also be provided to the processing system 200 through a storage medium, such as remote storage connected to the one or more computing devices over a network. The query 202 can further be provided as input through a user interface on a client computing device coupled to the processing system 200.

Based on the query 202, the processing system 200 can be configured to output one or more query plans 204. The query plans 204 can correspond to instructions for the external storage system to execute the query 202 to generate a query response. For example, the processing system 200 can be configured to provide the query plans 204 as a set of computer-readable instructions, such as one or more computer programs. The computer programs can be written in any type of programming language and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. As another example, the processing system 200 can be configured to forward the query plans 204 to one or more other devices configured for translating the query plans 24 into an executable program written in a computer programming language. As yet another example, the processing system 200 can be configured to send the query plans 204 for display on a client or user display and/or be configured to send the query plans 204 to a storage device for storage and later retrieval.

The processing system 200 can include a query plan generation engine 206 and a response engine 208. The query plan generation engine 206 and/or response engine 208 can be implemented as one or more computer programs, specially configured electronic circuitry, or any combination thereof.

The query plan generation engine 206 can be configured to generate the query plan 204 using one or more machine learning models. The machine learning models can be large language models, as an example. The query plan generation engine 206 can use the machine learning models to generate the query plan 204 as a dependency tree of operations based on the query 202. The tree of operations can include the query 202 as the root with a plurality of search candidates and/or one or more processing operations as leaves.

The search candidates can include one or more forms of search and candidate content for searching. Example forms of search can include document retrieval by embedding, lexical search, and/or image search. As an example, the tree of operations can include one or more leaves corresponding to document retrieval by embedding, where the machine learning models generate hallucinations to resemble the content to be retrieved and perform semantic matching based on the generated hallucinations. The candidate content can be represented as search constraints in the dependency tree of operations.

The processing operations can include merge operations, translation operations, and/or enriching operations. Example merge operations can include filtering, joining, and/or reranking of the content generated by the plurality of search candidates. Example translation operations can include translating natural language into standard query language or graphical query language. Example enriching operations can include enriching the search candidates with known information to provide context for search candidates to aid the other processing operations. Known information can include publicly available information or other information provided to the processing system 200. In that regard, the processing system 200 can be further configured to receive known information in addition to or as part of the query 202.

The query plan generation engine 206 can use the machine learning models to express the dependency tree of operations as execution instructions or as a solution template. The execution instructions can be a step by step guide for the external storage system to respond to the query 202. The solution template can include slots for the external storage system to fill in for responding to the query 202.

The response engine 208 can be configured to output the query plan 204 to the external storage system for execution. The response engine 208 can output query plans generated in response to the query 202 and/or can output previously generated query plans stored in a database, rather than having the query plan generation engine 206 generate a new query plan for each query. For example, generated query plans can be stored in a database for future retrieval based on subsequently received query. The response engine 208 can retrieve previously generated query plans based on the content included in the currently received query or the response engine 208 can determine a new query plan should be generated by the query plan generation engine 206. As an example, queries can be mapped to query plans via a multi-class problem where various query plans can correspond to candidate query plans. This can save computing resources and improve processing speed, as the processing system does not necessarily need to generate a new query plan for each query received.

Figure 3:
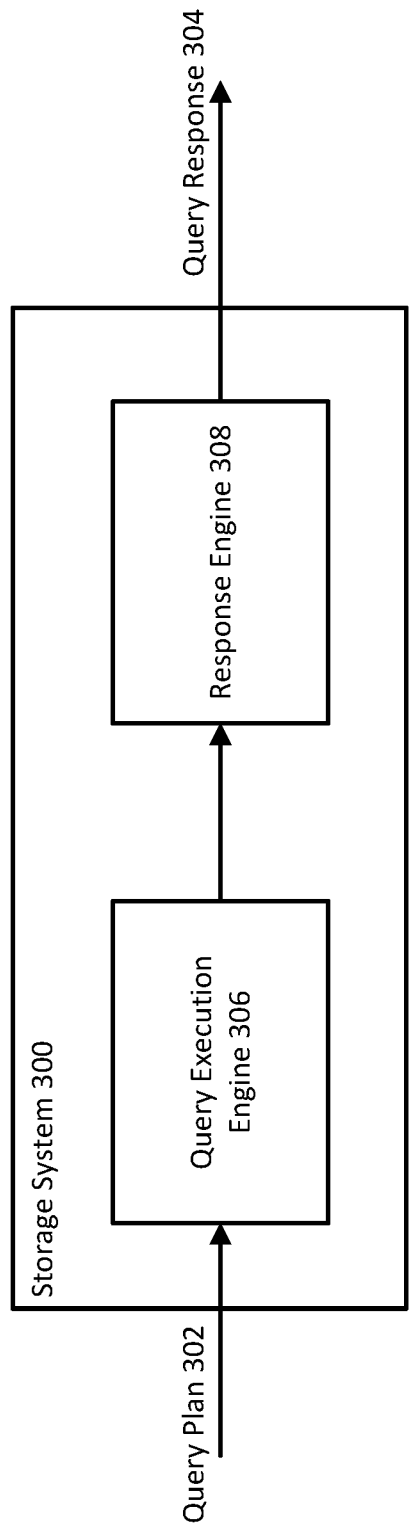
FIG. 3 depicts a block diagram of an example external storage system according to aspects of the disclosure.

FIG. 3 depicts a block diagram of an example external storage system 300. The external storage system 300 can correspond to the external storage system 102 as depicted in FIG. 1.

The external storage system 300 can be configured to receive one or more query plans 302 from the processing system, such as the processing system 200 as depicted in FIG. 2. As examples, the external storage system 300 can receive the query plan 302 as part of a call to an API, through a storage medium, and/or through a user interface.

Based on the query plan 302, the external storage system 300 can be configured to output one or more query responses 304. The query responses 304 can be based on the queries received by a processing system, such as the processing system 200 as depicted in FIG. 2. For example, the query response 304 can be content requested in a query for content retrieval. As another example, the query response 304 can be an answer to a question received as part of a query. As example, the external storage system 300 can provide the query response 304 as a set of computer-readable instructions, forward the query response 304 to one or more devices, send the query response 304 for display on a client or user display, and/or send the query response 304 for storage on a storage device.

The external storage system 300 can include a query execution engine 306 and a response engine 308. The query execution engine 306 and/or response engine 308 can be implemented as one or more computer programs, specially configured electronic circuitry, or any combination thereof.

The query execution engine 306 can be configured to process the query plan 302 using content stored in the external storage system 300 to generate the query response 304. For example, the query execution engine 306 can follow execution instructions and/or fill in slots in a solution template, where the execution instructions and/or solution template represent the dependency tree of operations generated by the machine learning models in the processing system.

The response engine 308 can be configured to output the query response 304. The response engine 308 can output the query response 304 back to the processing system, such as the processing system 200 as depicted in FIG. 2. Alternatively, or additionally, the response engine 308 can output the query response 304 directly to the origin of the query, such as a client or user device that transmitted the query. The response engine 300 can further output previously generated query responses stored in a database, rather than having the query execution engine 306 generate a new query response for each query. For example, query responses can be stored in a database for future retrieval based on subsequently received query plans. The response engine 308 can retrieved previously generated query responses based on the instructions in the query plan 302 or the response engine 308 can determine a new query response should be generated by the query execution engine 306. For instance, query plans can be mapped to query responses via a multi-class problem where various query responses can correspond to candidate query responses. This can further save computing resources and improve processing speed, as the external storage system 300 does not necessarily need to generate a new query response for each query. Instead, the external storage system 300 can improve storage capacity, as the storage system 300 would need less processing resources.

Figure 4:
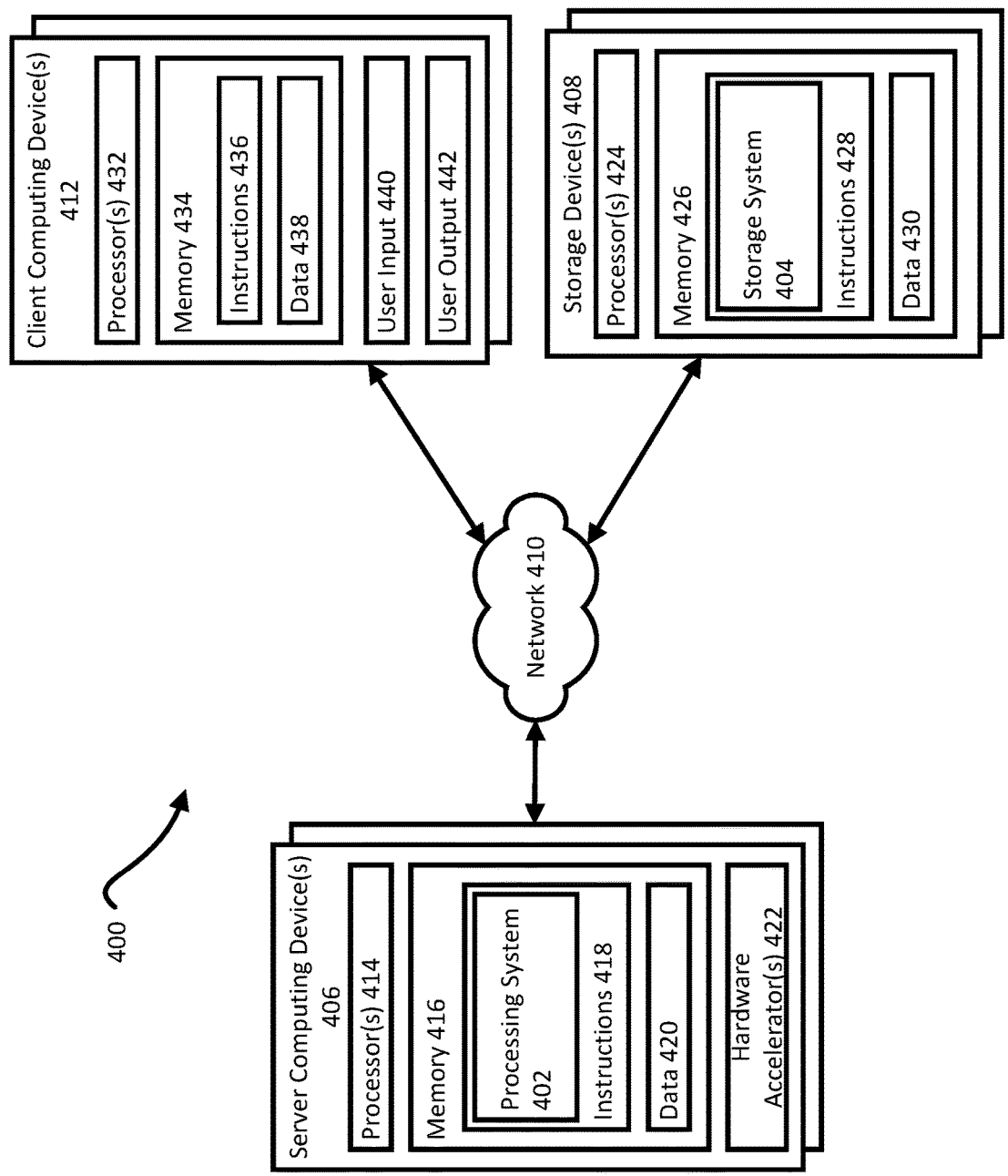
FIG. 4 depicts a block diagram of an example environment for implementing a processing system and external storage system according to aspects of the disclosure.

FIG. 4 depicts a block diagram of an example environment 400 for implementing a processing system 402 and external storage system 404. The processing system 402 and external storage system 404 can be implemented on one or more devices having one or more processors in one or more locations, such as in one or more server computing devices 406 for the processing system 402 and one or more storage devices 408 for the external storage system 404. The server computing devices 406 and the storage devices 408 can be communicatively coupled over a network 610. The server computing devices 406 and storage devices 408 can further be communicatively coupled over the network 610 to one or more client computing devices 412.

The server computing devices 406 can include one or more processors 414 and memory 416. The memory 416 can store information accessible by the processors 414, including instructions 418 that can be executed by the processors 414. The memory 416 can also include data 420 that can be retrieved, manipulated, or stored by the processors 414. The server computing devices 406 can further include one or more accelerators 422 specified for deploying one or more machine learning models, such as for generating query plans as disclosed herein.

The memory 416 can be a type of transitory or non-transitory computer readable medium capable of storing information accessible by the processors 414, such as volatile and non-volatile memory. For example, the memory 416 can include any type of non-transitory computer readable medium capable of storing information, such as a hard-drive, solid state drive, tape drive, optical storage, memory card, ROM, RAM, DVD, CD-ROM, write-capable, and read-only memories. The processors 414 can include one or more central processing units (CPUs), graphic processing units (GPUs), and/or field-programmable gate arrays (FPGAs), as examples. The accelerators 422 can also include one or more GPUs and/or FPGAs as well as application-specific integrated circuits (ASICs), such as tensor processing units (TPUs) and/or wafer scale engines (WSEs), as examples.

The instructions 418 can include one or more instructions that, when executed by the processors 414, cause the one or more processors 414 to perform actions defined by the instructions 418. The instructions 418 can be stored in object code format for direct processing by the processors 414, or in other formats including interpretable scripts or collections of independent source code modules that are interpreted on demand or compiled in advance. The instructions 418 can include instructions for implementing the processing system 402, which can correspond to the processing system 200 as depicted in FIG. 2. The processing system 402 can be executed using the processors 414 and/or accelerators 422, and/or using other processors and/or accelerators remotely located from the server computing devices 406.

The data 420 can be retrieved, stored, or modified by the processors 414 in accordance with the instructions 418. The data 420 can be stored in computer registers, in a relational or non-relational database as a table having a plurality of different fields and records, or as JSON, YAML, Protocol Buffers, or XML documents. The data 420 can also be formatted in a computer-readable format such as, but not limited to, binary values, ASCII, or Unicode. Moreover, the data 420 can include information sufficient to identify relevant information, such as numbers, descriptive text, proprietary codes, pointers, references to data stored in other memories, including other network locations, or information that is used by a function to calculate relevant data.

Utilizing the accelerators 422, the server computing devices 406 can maintain a variety of machine learning models. For example, the server computing devices 406 can maintain different families for deploying models on various types of accelerators 422 available for processing.

Figure 5:
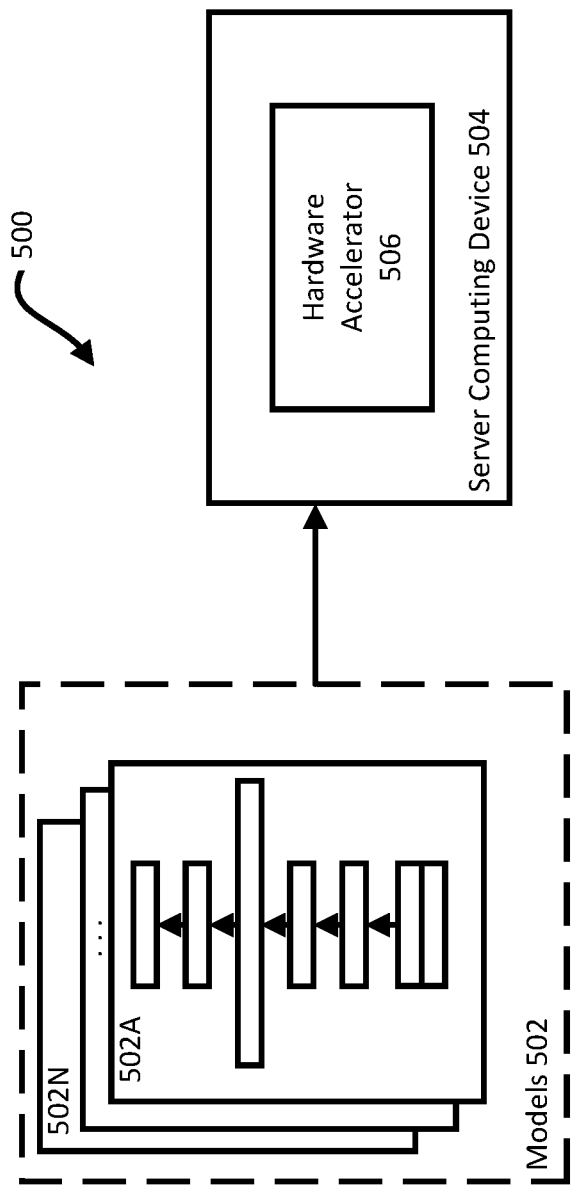
FIG. 5 depicts a block diagram illustrating one or more machine learning model architectures according to aspects of the disclosure.

FIG. 5 depicts a block diagram 500 illustrating one or more machine learning model architectures 502, more specifically 502A-N for each architecture, for deployment in a server computing device 504 housing a hardware accelerator 506 on which the deployed machine learning models 502 will execute, such as for generating a query plan as described herein. The hardware accelerator 506 can be any type of processor, such as a CPU, GPU, FPGA, or ASIC such as a TPU or WSE.

An architecture 502 of a machine learning model can refer to characteristics defining the model, such as characteristics of layers for the model, how the layers process input, or how the layers interact with one another. The architecture 502 of the machine learning model can also define types of operations performed within each layer. One or more machine learning model architectures 502 can be generated that can output results, such as for generating query plans to respond to queries. Example model architectures 502 can correspond to large language models (LLMs) or large model processing more generally.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

Referring back to FIG. 4, the storage devices 408 can be configured with processors 424, memory 426, instructions 428, and data 430. The processors 424, memory 426, instructions 428, and data 430 can be similarly described as the processors 414, memory 416, instructions 418, and data 420 of the server computing devices 406. The instructions 428 can include instructions for implementing the external storage system 404, which can correspond to the external storage system 300 as depicted in FIG. 3. The external storage system 404 can be executed using the processors 424, and/or using other processors remotely located from the storage devices 408.

The client computing devices 412 can also be configured with processors 432, memory 434, instructions, 436, and data 438, which can also be similarly described as the processors 414, memory 416, instructions 418, and data 420 of the server computing devices 406. The client computing devices 412 can also include a user input 440 and a user output 442. The user input 440 can include any appropriate mechanism or technique for receiving input from a user, such as keyboard, mouse, mechanical actuators, soft actuators, touchscreens, microphones, and/or sensors. The user output 442 can include a display configured to display at least a portion of received data from the server computing devices 406 and/or storage devices 408. The user output 442 can also include an interface between the client computing devices 412 and the server computing devices 406 and/or storage devices 408. The user output 442 can alternatively or additionally include one or more speakers, transducers or other audio outputs, a haptic interface or other tactile feedback that provides non-visual and non-audible information to the user of the client computing devices 412.

The server computing devices 406 can be configured to receive requests to process data from the client computing devices 412 based on storage content stored in the storage devices 408. For example, the environment 400 can be part of a computing platform configured to provide a variety of services to users, through various user interfaces and/or application programming interfaces (APIs) exposing the platform services. The variety of services can include responding to queries for tasks such as document retrieval and/or question answering. The client computing devices 412 can transmit input data as part of a query for a particular task. The processing system 402 can receive the input data, and in response, generate output data including a query plan for responding to the particular task. The external storage system 404 can receive the output data from the processing system 402, and in response, generate output data including a response to the query for the particular task.

The server computing devices 406, storage devices 408, and client computing devices 412 can each include one or more internal clocks providing timing information, which can be used for time measurement for operations and programs respectively run by the server computing devices 406, storage devices 408, and client computing devices 412.

The server computing devices 406, storage devices 408, and client computing devices 412 can be capable of direct and indirect communication over the network 410. For example, using a network socket, the client computing devices 412 can connect to a service through an Internet protocol. The server computing devices 406, storage devices 408, and client computing devices 412 can set up listening sockets that may accept an initiating connection for sending and receiving information. The network 410 can include various configurations and protocols including the Internet, World Wide Web, intranets, virtual private networks, wide area networks, local networks, and private networks using communication protocols proprietary to one or more companies. The network 410 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 410, in addition or alternatively, can also support wired connections between the server computing devices 406, storage devices 408, and client computing devices 412, including over various types of Ethernet connection.

Although FIG. 4 illustrates the processors 414, 424, 432 and the memories 416, 426, 434 as being within the respective devices 406, 408, 412, components described herein can include multiple processors and memories that can operate in different physical locations and not within the same computing or storage device. For example, some of the instructions 418, 428, 436 and the data 420, 430, 438 can be stored on a removable SD card and others within a read-only computer chip. Some or all of the instructions 418, 428, 436 and data 420, 430, 438 can be stored in a location physically remote from, yet still accessible by, the processors 414, 424, 432. Similarly, the processors 414, 424, 432 can include a collection of processors that can perform concurrent and/or sequential operation.

Although a single server computing device 406, storage device 408, and client computing device 412 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

Figure 6:
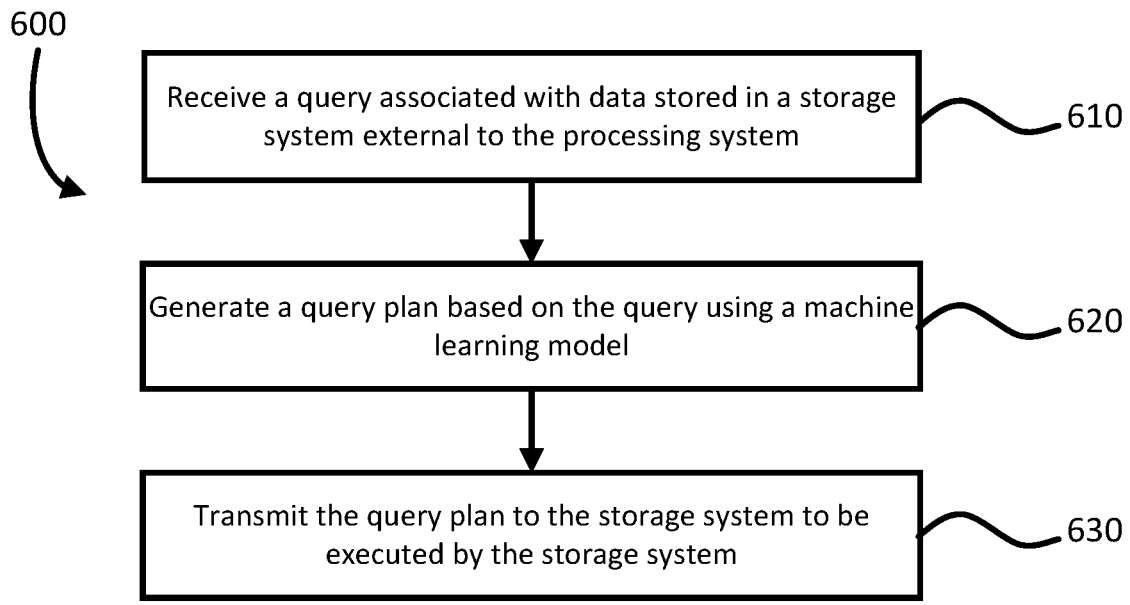
FIG. 6 depicts a flow diagram of an example process for generating a query plan for processing a query according to aspects of the disclosure.

FIG. 6 depicts a flow diagram of an example process 600 for generating a query plan. The example process 600 can be performed on a system of one or more processors and/or accelerators in one or more locations, such as the processing system 200 as depicted in FIG. 2.

As shown in block 610, the processing system 200 receives a query associated with data stored in a storage system external to the processing system 200. The processing system 200 can receive the query from a client computing device, such as through a user interface. The query can be associated with one or more tasks, such as document retrieval and/or question answering. The storage system external to the processing system 200 can be a secure storage system, such as storage secured with cryptographic techniques, local storage system, such as storage local to the client computing device, and/or an eventually consistent storage system, such as storage that may include stale data at a current time state but that the data will become up to date at a later time state.

As shown in block 620, the processing system 200 generates a query plan based on the query using one or more machine learning models. The query plan includes a dependency tree of operations with a plurality of search candidates and one or more processing operations as leaves of the dependency tree. The dependency tree of operations can further include the query as the root of the dependency tree. The dependency tree of operations can be represented as execution instructions for the storage system and/or a solution template with slots to be defined by the data in the storage system.

The plurality of search candidates can include document retrieval by embedding, lexical search, and/or image search. The plurality of search candidates can further include hallucinations generated by the machine learning models to represent the data stored in the storage system. The processing operations can include merging operations and/or translating operations. The merging operations can include filtering, joining, and/or reranking of search results generated by the search candidates, as examples. The translating operations can include translating natural language into standard query language and/or graphical query language, as examples.

The processing system 200 can further refine the query plan using the machine learning models based on data available to the machine learning models to provide context for the search candidates and/or processing operations. The data available to the machine learning models can include publicly available data and/or proprietary data of the user of the client computing device.

The machine learning models can include large language models. The machine learning models can translate the query into a structured language having search constraints representing the search candidates and processing operations. The machine learning models can further compile the structured language to form the dependency tree of operations.

As shown in block 630, the processing system 200 transmits the query plan to the storage system to be executed by the storage system. Once executed, the processing system 200 can receive a query response from the storage system. The processing system 200 can output the query response back to the client computing device, to another client or server computing device, and/or to a storage device for storage and later retrieval.

Figure 7:
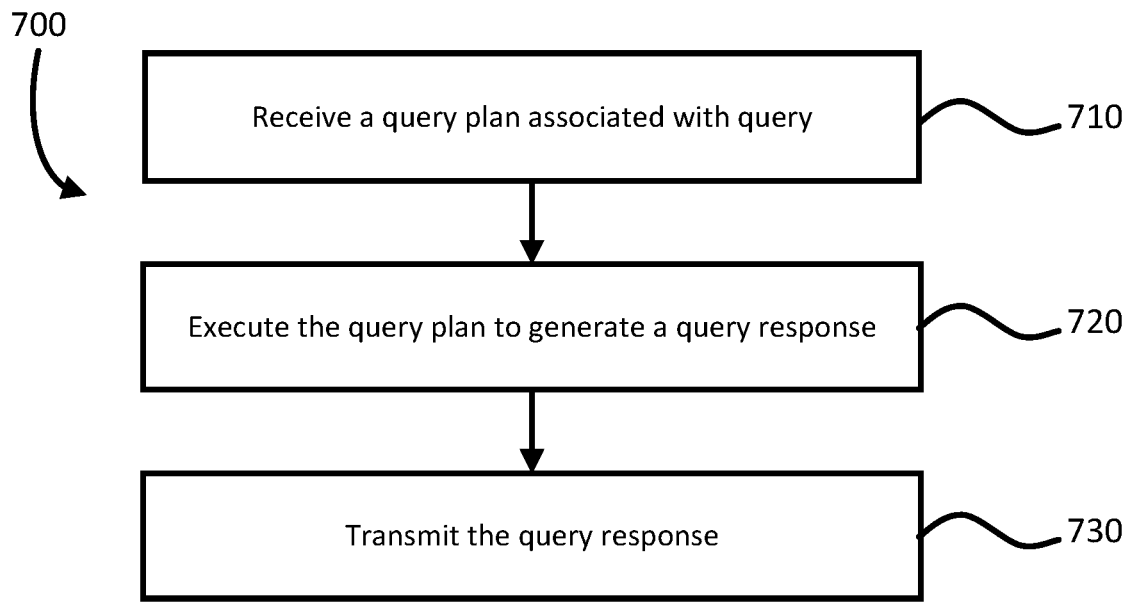
FIG. 7 depicts a flow diagram of an example process for generating a query response for processing a query according to aspects of the disclosure.

FIG. 7 depicts a flow diagram of an example process 600 for generating a query response. The example process 700 can be performed on a system of one or more processors in one or more locations, such as the external storage system 300 as depicted in FIG. 3.

As shown in block 710, the external storage system 300 receives a query plan associated with a query for responding to the query. The query plan can be generated and output by a processing system separate from the external storage system, such as processing system 200 as depicted in FIG. 2.

As shown in block 720, the external storage system 300 executes the query plan using content stored on the external storage system to generate a query response. The external storage system 300 can follow execution instructions and/or fill in slots in a solution template, where the execution instructions and/or solution template represent the dependency tree of operations of the query plan. The external storage system 300 can retrieve particular content based on the execution instructions and/or fill in the slots of the solution template with the particular content.

As shown in block 730, the external storage system 300 transmits the query response. The external storage system 300 can transmit the query response back to the processing system, directly to the client computing device where the query was received, to another client or server computing device, and/or to a storage device for storage and later retrieval.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing a query, the method comprising:
   receiving, by one or more processors, a query associated with data stored in a storage system external to the one or more processors;
   generating, by the one or more processors, a query plan based on the query without accessing the data stored in the storage system using a machine learning model, the machine learning model configured to:
      generate a representation of the data stored in the storage system that does not encompass the data itself; and
      generate a dependency tree of operations for responding to the query based on the representation of the data stored in the storage system, the dependency tree of operations comprising a plurality of search candidates and one or more processing operations as leaves of the dependency tree; and
   transmitting, by the one or more processors, the query plan to the storage system to be executed by the storage system for responding to the query.

2. The method of claim 1, wherein the query is associated with a task comprising at least one of document retrieval or question answering.

3. The method of claim 1, wherein the dependency tree comprises the query as a root of the dependency tree.

4. The method of claim 1, wherein the search candidates comprise at least one of document retrieval by embedding, lexical search, or image search.

5. The method of claim 1, wherein the representation of the data stored in the storage system comprises hallucinations resembling the data stored in the storage system.

6. The method of claim 1, wherein the processing operations comprise at least one of merging operations or translating operations.

7. The method of claim 6, wherein the merging operations comprise at least one of filtering, joining, or reranking of search results generated by the search candidates.

8. The method of claim 6, wherein the translating operations comprise translating natural language into at least one of standard query language or graphical query language.

9. The method of claim 1, wherein the query plan is represented as execution instructions for the storage system or a solution template with slots to be defined by the data in the storage system.

10. The method of claim 1, further comprising refining the query plan using the machine learning model based on data available to the machine learning model to provide context for the search candidates.

11. The method of claim 1, wherein generating the query plan further comprises:
translating the query into a structured language having search constraints representing the search candidates and processing operations; and
compiling the structured language to form the dependency tree.

12. A system comprising:
one or more processors; and
one or more storage devices coupled to the one or more processors and storing instructions that, when executed by the one or more processors, cause the one or more processors to perform operations for processing a query, the operations comprising:
receiving a query associated with data stored in a storage system external to the one or more processors;
generating a query plan based on the query without accessing the data stored in the storage system using a machine learning model, the machine learning model configured to:
generate a representation of the data stored in the storage system that does not encompass the data itself; and
generate a dependency tree of operations for responding to the query based on the representation of the data stored in the storage system, the dependency tree of operations comprising a plurality of search candidates and one or more processing operations as leaves of the dependency tree; and
transmitting the query plan to the storage system to be executed by the storage system for responding to the query.

13. The system of claim 12, wherein the dependency tree comprises the query as a root of the dependency tree.

14. The system of claim 12, wherein the search candidates comprise document retrieval by embedding, lexical search, or image search.

15. The system of claim 12, wherein the processing operations comprise at least one of merging operations or translating operations.

16. The system of claim 12, wherein the query plan is represented as execution instructions for the storage system or a solution template with slots to be defined by the data in the storage system.

17. The system of claim 12, wherein the operations further comprise refining the query plan using the machine learning model based on data available to the machine learning model to provide context for the search candidates.

18. The system of claim 12, wherein generating the query plan further comprises:
translating the query into a structured language having search constraints representing the search candidates and processing operations; and
compiling the structured language to form the dependency tree.

19. A non-transitory computer readable medium for storing instructions that, when executed by one or more processors of a processing system, cause the one or more processors to perform operations for processing a query, the operations comprising:
receiving a query associated with data stored in a storage system external to the one or more processors;
generating a query plan based on the query without accessing the data stored in the storage system using a machine learning model, the machine learning model configured to:
generate a representation of the data stored in the storage system that does not encompass the data itself; and
generate a dependency tree of operations for responding to the query based on the representation of the data stored in the storage system, the dependency tree of operations comprising a plurality of search candidates and one or more processing operations as leaves of the dependency tree; and
transmitting the query plan to the storage system to be executed by the storage system for responding to the query.

20. The non-transitory computer readable medium of claim 19, wherein the operations further comprise refining the query plan using the machine learning model based on data available to the machine learning model to provide context for the search candidates.

* * * * *